United States Patent [19]

Devanneaux et al.

[11] Patent Number: 4,677,093
[45] Date of Patent: Jun. 30, 1987

[54] CATALYST FOR THE HYDROTREATMENT OF HYDROCARBON FEEDSTOCKS

[75] Inventors: Jacques Devanneaux, Montivilliers; Jean-Paul Gallez, Bolbec; Laurent Mariette, Deauville, all of France

[73] Assignee: Compagnie Francaise de Raffinage, Paris, France

[21] Appl. No.: 903,856

[22] Filed: Aug. 29, 1986

Related U.S. Application Data

[63] Continuation of Ser. No. 774,914, Sep. 11, 1985, abandoned.

[30] Foreign Application Priority Data

Sep. 14, 1984 [FR] France ................. 84 14109

[51] Int. Cl.$^4$ ............ B01J 27/043; B01J 27/047; B01J 27/049; B01J 27/051
[52] U.S. Cl. ......................... 502/220; 502/219; 502/221; 502/222; 502/223; 208/251 H
[58] Field of Search ............ 502/220, 219, 221, 222, 502/223; 208/251 H

[56] References Cited

U.S. PATENT DOCUMENTS

| | | | |
|---|---|---|---|
| 2,952,644 | 9/1960 | Holden | 252/465 |
| 4,024,231 | 5/1977 | Ziegenhain | 423/628 |
| 4,082,695 | 4/1978 | Rosinski et al. | 502/220 |
| 4,111,796 | 9/1978 | Yanik et al. | 208/216 |
| 4,119,531 | 10/1978 | Hopkins et al. | 208/251 H |
| 4,301,033 | 11/1981 | Takumi et al. | 252/448 |

FOREIGN PATENT DOCUMENTS

| | | | |
|---|---|---|---|
| 26508 | 4/1981 | European Pat. Off. | 208/251 H |
| 52-68093 | 6/1977 | Japan | 502/220 |
| 1407610 | 9/1975 | United Kingdom . | |
| 1538036 | 1/1979 | United Kingdom . | |
| 1560599 | 2/1980 | United Kingdom . | |

Primary Examiner—W. J. Shine
Attorney, Agent, or Firm—A. Thomas S. Safford

[57] ABSTRACT

The invention relates to a hydrodemetallization process and catalyst, of a sulfur and organometallic containing hydrocarbon feedstock which consists in contacting the feedstock under the usual hydrotreating conditions with a catalyst comprising a refractory mineral carrier composed essentially of a mesoporous alumina with defined characteristics, said catalyst having previously been sulfurized. The process is characterized in that the catalyst contains, in addition to the carrier, in free or combined form, from 0.01 to 0.7 weight percent, based on the total weight of the catalyst, and calculated as if in elemental form, of at least one metal selected from groups Vb, VIb, VIIb and VIII of the periodic table of the elements, so as to give optimum initial demetallizing activity.

7 Claims, 1 Drawing Figure

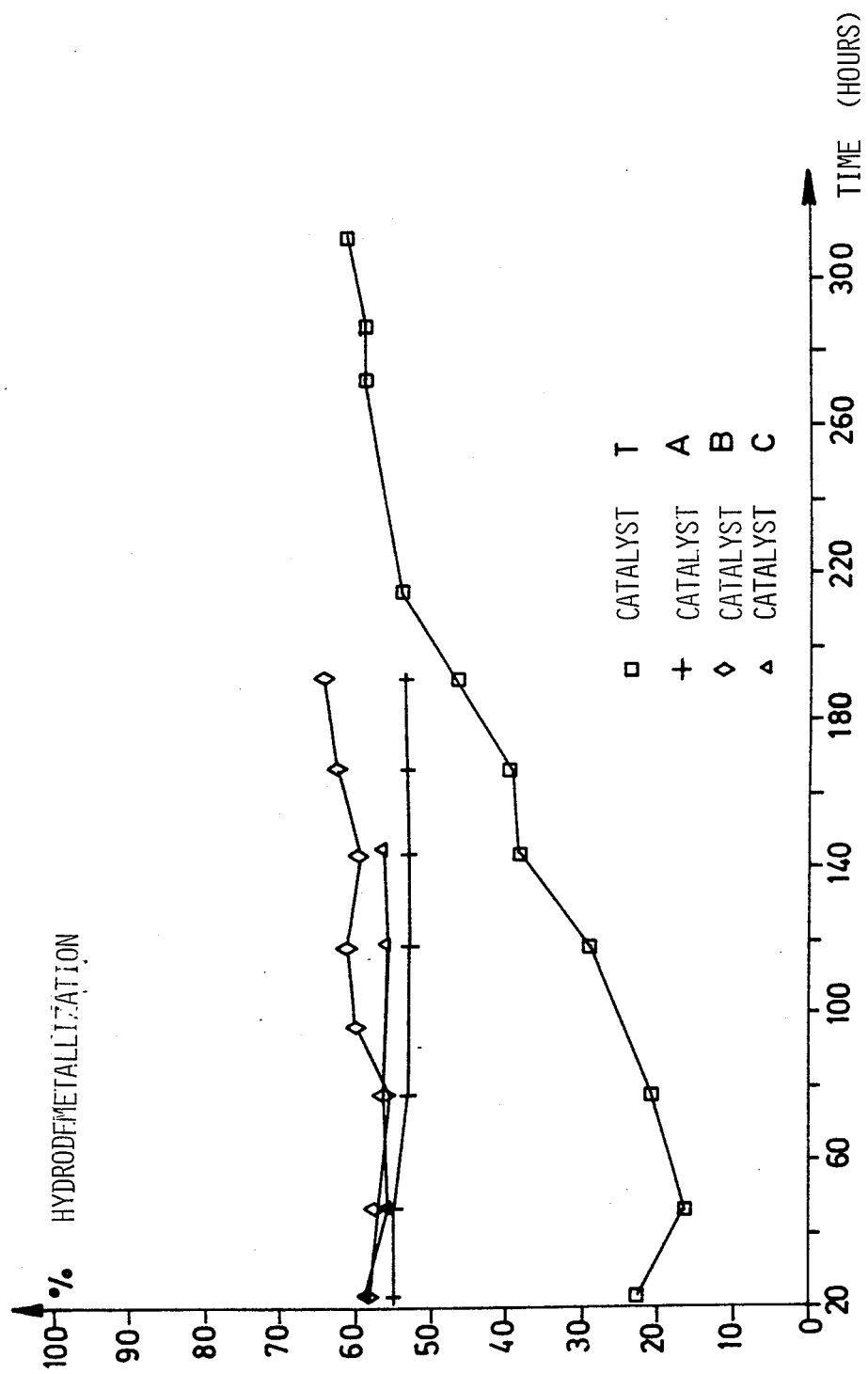

CATALYST FOR THE HYDROTREATMENT OF HYDROCARBON FEEDSTOCKS

This application is a continuation of application Ser. No. 774,914, filed Sept. 11, 1985, now abandoned.

The present invention relates to a process for the hydrotreatment, and particularly the hydrodemetallization, of hydrocarbon feedstocks. It further relates to a hydrotreating catalyst suitable for use in the practice of said process.

Heavy hydrocarbon feedstocks, such as crude oils, distillation residues of such crude oils, or feedstocks derived from coal, for example, contain organometallic compounds, mainly of nickel and vanadium. These metals are poisons for the catalysts used in the processes for the catalytic treatment of these feedstocks, such as hydrodesulfurization or catalytic cracking processes.

It is therefore advisable to subject these feedstocks to a hydrotreatment prior to these catalytic treatments for the specific purpose of demetallizing them as completely as possible.

It has been proposed to use bauxite (U.S. Pat. No. 2,687,985) or alumina (U.S. Pat. No. 3,901,792 and British Pat. No. 1,560,599) to effect this demetallization.

It has also been proposed to use alumina on which at least one metal from groups VI and VIII of the periodic table of the elements has been deposited.

Thus, U.S. Pat. No. 4,119,531 describes a demetallization catalyst containing from 0.5 to 3 weight percent, and preferably from 1 to 2 weight percent, molybdenum oxide deposited on a macroporous alumina. The metal is necessary to obtain optimum demetallizing activity. Without the metal on the alumina, the induction period (the time which elapses between the introduction of the feedstock and the onset of optimum demetallizing activity) is too long.

In the course of its research on demetallization catalysts for hydrocarbon feedstocks, the assignee of the present application discovered that mesoporous aluminas activated with a sulfurous compound and having specific characteristics are very good demetallization catalysts. A mesoporous alumina is an alumina having a porosity intermediate between that of a microporous alumina and a macroporous alumina. In the case of the present specification, less than 10 percent of the pore volume is made up of pores with a radius of $1,000 \times 10^{-8}$ cm or greater.

These catalysts were the subject matter of U.S. application Ser. No. 590,061, filed on Mar. 15, 1984, now abandoned. In the case of some hydrocarbon feedstocks, optimum demetallizing activity is obtained quite rapidly with these alumina, activated with a sulfurous compound. Applicants have discovered that this is true of feedstocks containing a sufficient amount of contaminating metals (vanadium and nickel), which autocatalyze the demetallization reaction. This is the case with the oil obtained by heavy-solvent deasphalting of an atmospheric-distillation residue of a crude oil of Boscan origin. With other feedstocks containing less contaminating metals, such as the vacuum-distillation residue of an atmospheric-distillation residue of a crude oil from kirkuk, it takes longer to obtain optimum demetallizing activity, which is less than satisfactory from the industrial point of view. In the case of the products named above, three times as much time is required for the Kirkuk product as for the Boscan product. This is consistent with the respective metal contents of these feedstocks (about 150 and 450 ppm, respectively).

Applicants have found that good demetallization catalysts having optimum initial demetallizing activity can be obtained by incorporating in the mesoporous alumina to which U.S. application Ser. No. 590,061, now abandoned, relates small amounts of at least one metal in considerably lower proportions than those incorporated in the macroporous alumina of U.S. Pat. No. 4,119,531, followed by sulfurization of the product so obtained.

The present invention thus seeks to achieve the effective demetallization of hydrocarbon feedstocks with a very short induction period of the alumina.

To this end, the invention has as an embodiment a process for the hydrotreatment, and particularly the hydrodemetallization, of a hydrocarbon feedstock which consists in contacting the feedstock under the usual hydrotreating conditions with a catalyst comprising a refractory mineral carrier composed essentially of an alumina whose characteristics are:

- a specific surface of over 150 m$^2$/g, and preferably over 175 m$^2$/g;
- a bore volume of over 0.6 cm$^3$/g, and preferably over 0.7 cm$^3$/g;
- a pore-volume distribution based on the pore radius wherein at least 50 percent of the pores have a radius of $100 \times 10^{-8}$ cm or smaller and less than 10 percent of the pores have a radius of $1,000 \times 10^{-8}$ cm or greater; and
- a mode of distribution of the pore radii in cm (maximum of the pore-radii distribution curve) with radii ranging from 40 to $70 \times 10^{-8}$ cm, said catalyst being sulfurized before the process is carried out, and optionally also during the process, said process being characterized in that the catalyst contains, in addition to the carrier, in free or combined form, from 0.01 to 0.7 weight percent, based on the total weight of the catalyst, and calculated as if in elemental form, of at least one metal selected from groups Vb, VIb, VIIb and VIII of the periodic table of the elements.

In connection with this object of the invention and hereinafter in the present specification, it will be understood that the pore volume made up of pores with a radius of $100 \times 10^{-8}$ cm or smaller is measured with nitrogen by the BET method, and that made up of pores with a radius of over $100 \times 10^{-8}$ cm (and consequently that made up of pores with a radius of $1,000 \times 10^{-8}$ cm or greater) with a mercury porosimeter.

The invention has as a further embodiment a catalyst for the hydrotreatment of hydrocarbon feedstocks suitable for use in the hydrotreating process defined above, said catalyst comprising a refractory mineral carrier essentially composed of an alumina whose characteristics are:

- a specific surface of over 150 cm$^2$/g, and preferably over 175 m$^2$/g;
- a pore volume of over 0.6 cm$^3$/g, and preferably over 0.7 cm$^3$/g;
- a pore-volume distribution based on the pore radius wherein at least 50 percent of the pores have a radius of $100 \times 10^{-8}$ cm or smaller and less than 10 percent of the pores have a radius of $1,000 \times 10^{-8}$ cm or greater; and
- a mode of distribution of the pore radii in cm (maximum of the pore-radii distribution curve) with radii ranging from 40 to $70 \times 10^{-8}$ cm, said catalyst bing sulfurized before the process is carried out, and optionally also during the process, said catalyst being characterized in that it contains, in addition to the carrier, in free or combined form, from 0.01 to 0.7 weight percent, based on the total weight of the catalyst, and calculated as if in elemental form, of at least one metal selected from groups Vb, VIb, VIIb and VIII of the periodic table of the elements.

In the hydrotreating process of the invention, the catalyst is in all cases sulfurized before the process is carried out, and optionally also during the process. Sulfurization of the catalyst, by methods well known to those skilled in the art, serves to convert the metals which it contains into sulfides.

Sulfurization may be effected by contacting the catalyst with hydrogen sulfide.

The latter may:
 (a) be supplied by an external source;
 (b) come from a desulfurization reaction which the feedstock undergoes in combination with the hydrotreatment;
 (c) be generated in situ by the decomposition of a sulfurous compound added to the feedstock, for example, by the decomposition of dimethyl disulfide; or
 (d) be generated in situ by the decomposition of other sulfurous compounds present in the feedstock.

In case (b), the catalysst may be used in combination with a conventional desulfurization catalyst, such as one which comprises an alumina-based refractory carrier on which compounds of the metals of groups VI and VIII of the periodic table have been deposited.

When the hydrotreating catalyst of the invention is charged to a first reactor of a train of several reactors in which the other reactors contain a hydrodesulfurization catalyst (the first reactor having the function of eliminating the metals from the feedstock to prevent poisoning of the hydrodesulfurization catalyst), at least a fraction of the effluent gas from the train of reactors, which is rich in hydrogen sulfide, may be recycled to the inlet of the first reactor throughout or during part of the hydrotreating cycle for the purpose of activating the catalyst of the invention.

The simplest and therefore the preferred mode of practicing the process is the one where the catalyst is sulfurized by being contacted with hydrogen sulfide generated in situ by the decomposition of sulfurous compounds present in the feedstock. Applicants have found that only a small amount of hydrogen sulfide is necessary to initiate the hydrotreating reaction. Applicants have further found that the hydrogen sulfide required to activate the catalyst can be produced in situ from sulfurous compounds present in the feedstock by utilizing the very low but adequate desulfurizing power of the catalyst.

The catalyst in accordance with the invention may be used for the hydrodemetallization of a hydrocarbon feedstock.

Applicants attribute the demetallizing properties of the catalyst to the fact that sulfides, and primarily vanadium sulfides, which are the active phases, will deposit on the catalyst during the induction period.

The catalysts in accordance with the invention contain, in addition to the carrier, in free or combined form, from 0.01 to 0.7 weight percent, based on the total weight of the catalyst, and calculated as if in elemental form, of at least one metal selected from groups Vb, VIb, VIIb and VIII of the periodic table of the elements.

The metal content preferably ranges from 0.2 to 0.6 weight percent. In a preferred embodiment of the invention, the catalyst contains two metals selected from groups Vb, VIb, VIIb, and VIII of the Periodic Table.

The preferred metals are molybdenum, nickel, tungsten, cobalt, vanadium and ruthenium.

The carrier is essentially composed of alumina, but it may contain, in addition to alumina, one or more other refractory oxide minerals, such as silica, in an amount which may be as high as 30 percent by weight of the carrier.

The catalysts in accordance with the invention may be prepared by impregnating the carrier with at least one solution containing at least one metal selected from groups Vb, VIb, VIIb and VIII. Such impregnation may be followed by drying at a temperature between 70° and 130° C. and a calcination at a temperature ranging from 300° to 700° C., and preferably from 450° to 600° C.

The hydrotreating process of the invention is applicable particularly to the hydrodemetallization of heavy hydrocarbon feedstocks, such as distillation residues of crude oil or of deasphalted oil obtained by the solvent deasphalting of such a residue, whose characteristics, cited nonlimitatively, may be as follows:

| | |
|---|---|
| Density at 15° C. (determined in conformity with standard AFNOR NFT 60-101) | >800 kg/m$^3$ |
| Viscosity at 100° C. (standard AFNOR NFT 60-100) | >10 centistokes |
| Conradson residue (standard AFNOR NFT 60-116) | >0.1 wt. % |
| Sulfur content (determined by x-ray fluorescence) | >1 wt. % |
| Vanadium and nickel content (determined by x-ray fluorescence) | >10 ppm |

The operating conditions under which the hydrodemetallization is carried out are the usual conditions, such as:
 Temperature ranging from 350° to 450° C.
 Pressure ranging from 50 to 200 bar
 Hydrogen/hydrocarbon volume ratio ranging from 100 to 5,000 standard liters/liter
 Hourly space velocity of feedstock (volume of liquid passing over a unit volume of catalyst per hour) ranging from 0.2 to 5.

BRIEF DESCRIPTION OF THE DRAWING

The accompanying FIGURE shows hydrodemetallizing percentages (reduction of the metal content in the effluent in relation to the feedstock) plotted against time for a control catalyst T and catalysts A, B and C according to the invention.

The examples which follow will serve to illustrate the invention without limiting it.

EXAMPLE 1

This example relates to the preparation of catalysts in accordance with the invention.

The alumina used is an alumina prepared for Applicants by American Cyanamid Company.

The characteristics of this alumina are given in Table 1 which follows.

TABLE 1

| | |
|---|---|
| Surface area, in m²/g | 188 |
| Total pore volume (V1 + V2), in cm³/g | 0.986 |
| Pore volume made up of pores with a radius of less than $100 \times 10^{-8}$ cm, in cm³/g (1) — V1 | 0.80 or 81% of total |
| Pore volume made up of pores with a radius of over $100 \times 10^{-8}$ cm, in cm³/g (2) — V2 | 0.186 or 19% of total |
| Pore volume made up of pores with a radius of $1,000 \times 10^{-8}$ cm or greater, in cm³/g (2) | 0.029 or 2.9% of total |
| Mode of distribution of pore radii, in cm | $65 \times 10^{-8}$ |

(1) Determined with nitrogen by the BET method.
(2) Determined with a mercury porosimeter.

With this alumina, three catalysts A, B and C in accordance with the invention are prepared.

Preparation of catalyst A

The alumina is impregnated with an aqueous solution of ammonium heptamolybdate, the concentration of the solution being such that the final catalyst contains 0.3 weight percent molybdenum trioxide, $MoO_3$. Impregnation is effected by circulation of the ammonium heptamolybdate solution. Following impregnation, the product obtained is dried for 16 hours at 110° C., then calcined in air for 2 hours at a temperature of 500° C.

The precursor of catalyst A is so obtained. It contains 0.3 weight percent molybdenum trioxide, $MoO_3$, or 0.2 weight percent molybdenum.

Preparation of catalyst B

Catalyst B is prepared in the same manner as catalyst A, except that the impregnating solution contains ammonium heptamolybdate and nickel nitrate.

The catalyst B so obtained contains 0.3 weight percent molybdenum trioxide, $MoO_3$, or 0.2 weight percent molybdenum, and 0.3 weight percent nickel oxide, NiO, or 0.23 weight percent nickel.

Preparation of catalyst C

The alumina is impregnated with a solution in ethanol of molybdenum acetylacetonate and vanadium acetylacetonate, the solution containing these salts in such concentration that the final catalyst contains 0.3 weight percent molybdenum trioxide, $MoO_3$, or 0.2 weight percent molybdenum, and 0.2 weight percent vanadium pentoxide, $V_2O_5$, or 0.1 weight percent vanadium.

The drying and calcination conditions are the same as in the preparation of catalysts A and B.

Sulfurization of catalysts A, B and C

Catalysts A, B and C are sulfurized in the reactor used in the hydrodemetallization tests to be described below.

Gas oil to which 2 weight percent dimethyl disulfide (DMDS) is added is passed at 250° C. over the catalyst under a hydrogen pressure of 30 bar at an hourly space velocity of 1 and a hydrogen/hydrocarbon volume ratio of 200.

The temperature is raised to 300° C., the injection of DMDS is stopped, the temperature is increased to 390° C., and the injection of gas oil is stopped.

The catalysts A, B and C are then ready for the hydrodemetallization tests.

EXAMPLE 2

This example relates to hydrodemetallization tests by the use of:
- the alumina used to prepare catalysts A, B and C and sulfurized in the same manner as catalysts A, B and C (see Example 1), thus giving the control catalyst T; and
- catalysts A, B and C.

The feedstock consists of the vacuum-distillation residue of an atmospheric-distillation residue of a Kirkuk crude oil.

The characteristics of this feedstock are given in Table 2 which follows.

TABLE 2

| | |
|---|---|
| Density at 15° C., kg/m³ | 1,025 |
| Viscosity at 100° C., centistokes | 890 |
| Conradson residue, wt. % | 18 |
| Asphaltene content, wt. % | 7 |
| Sulfur content, wt. % | 5 |
| Vanadium content, ppm | 120 |
| Nickel content, ppm | 55 |

The test conditions are as follows:

Temperature: 390° C.

Hydrogen pressure: 140 bar.

Hydrogen/feedstock volume ratio: 700 standard liters/liter.

Hourly space velocity: 1 vol/vol/hr.

The percentages of vanadium and nickel contained in the effluents are determined by analysis at regular intervals of time. Thus the hydrodemetallization percentages (reduction of the metal content in the effluent in relation to the feedstock) can be plotted against time.

These curves are shown in the accompanying figure.

It is apparent from that figure that the addition of a metal to the alumina reduces the induction period practically to zero. With two metals, the hydrodemetallization results are even better.

We claim:

1. A hydrotreating catalyst for the hydrodemetallization of a hydrocarbon feedstock, which comprises a refractory mineral carrier composed essentially of an alumina having a specific surface of over 150 m²/g; a pore volume of over 0.6 cm³/g; a pore-volume distribution based on the pore radius wherein at least 50 percent of the pores have a radius of $100 \times 10^{-8}$ cm or smaller and less than 10 percent of the pores have a radius of $1,000 \times 10^{-8}$ cm or greater; and a mode of distribution of the pore radii in cm (maximum of the pore-radii distribution curve) with radii ranging from $40 \times 10^{-8}$ cm to $70 \times 10^{-8}$ cm;

said catalyst being sulfurized before the hydrodemetallization is carried out, and said catalyst further containing, in free or combined form, from 0.01 to 0.7 weight percent, based on the total weight of the catalyst, and calculated as if in elemental form, of two metals selected from groups Vb, VIb, VIIb and VIII of the periodic table of the elements.

2. A catalyst according to claim 1, wherein the alumina has a specific surface of over 175 m²/g and a pore volume of over 0.7 cm³/g.

3. A catalyst according to claim 1, wherein the metals are selected from the group consisting of molybdenum, nickel, tungsten, cobalt, vanadium and ruthenium.

4. A catalyst according to claim 1, wherein the catalyst contains from 0.2 to 0.6 weight percent of the metals.

5. A catalyst according to claim 2, wherein the catalyst contains from 0.2 to 0.6 weight percent of the metals.

6. A catalyst according to claim 1, wherein the metals are molybdenum and nickel.

7. A catalyst according to claim 1, wherein the metals are molybdenum and vanadium.

* * * * *